F. H. COOMBS.
Improvement in Treadles for Sewing Machines.
No. 125,176. Patented April 2, 1872.
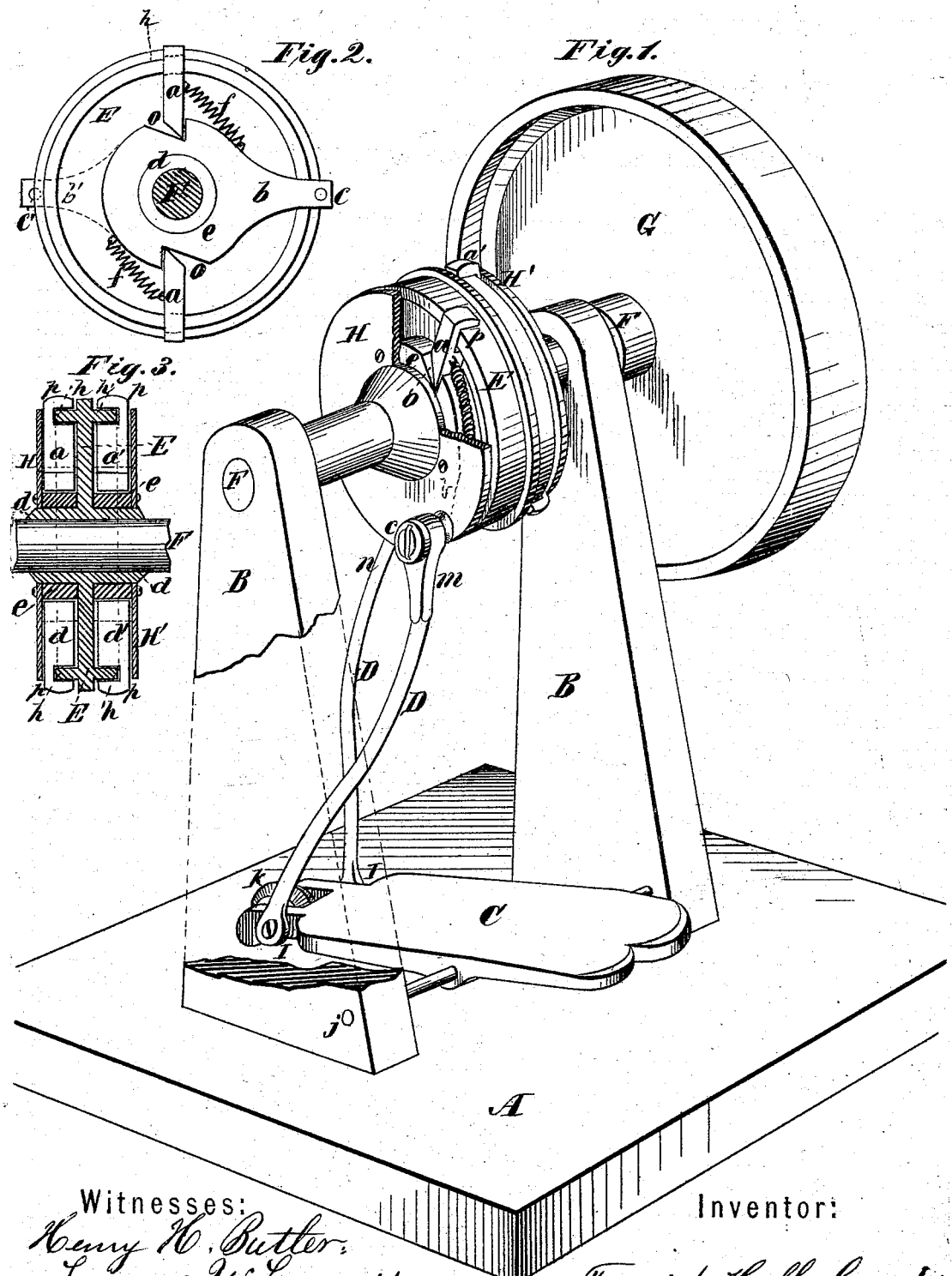
Witnesses:
Henry H. Butler.
Frank W. Leavitt.
Inventor:
Frederick Hobbs Coombs.

UNITED STATES PATENT OFFICE.

FREDERICK HOBBS COOMBS, OF BANGOR, MAINE.

IMPROVEMENT IN TREADLES FOR SEWING-MACHINES.

Specification forming part of Letters Patent No. 125,176, dated April 2, 1872.

Specification describing certain Improvements in Treadles for Sewing-Machines, invented by FREDERICK HOBBS COOMBS, of Bangor, in the county of Penobscot and State of Maine.

My invention relates to the method of obtaining and using foot-power as applied to sewing-machines or any other machines driven by foot-power, where it is desirable to impart motion to a shaft so that it shall revolve continuously in the desired direction.

In the accompanying drawing, Figure 1 is a perspective view of my invention as applied simply to a shaft and fly-wheel. Fig. 2 is a plan of one side of the driving-wheel E, showing the arm and collar $b$ $e$, clutches $a$ $a$, wrist-pin $c$, section of shaft F, springs $f$ $f$, and the arrangement of the several parts. Fig. 3 is a sectional view, the section being in the direction of the length of the shaft, and shows the driving-wheel E, with its flanges $h$ and $h'$ on each side, the clutches $a$ and $a'$ also on each side of the wheel, the collar $e$, the collar $d$ of the driving-wheel, and the shaft F. Fig. 4 shows the pitmen D D' D'', foot-sandal C, arms $b$ $b'$, collar of driving-wheel $d$, collar $e$ of arm $b$, and shaft F.

I construct a driving-wheel, E, with the flanges or circular rims $h$ $h'$ on each side of its outer circumference, and the collar $d$ projecting on each side, and forming a bearing for the shaft and a center for the collars $e$ $e'$. I construct the arms $b$ $b'$ with collars $e$ $e'$ fitting over and revolving upon the collar $d$, and having in the outer circumference of the collar slots $o$ $o$, which receive the ends of the clutches $a$ $a$. The arms are fitted on the opposite sides of E, and revolve alternately past each other in opposite directions, and are attached to the pitmen D D', on opposite sides of the shaft F, by the wrist-pins $c$ $c'$, as shown in Fig. 4. I construct clutches with slots $p$ $p$ fitting loosely on the rims or flanges $h$ $h'$, so that when the end of the clutch, resting in the slot $o$, is pressed forward, one corner of the slot above and the opposite corner of the slot below the flange will bind on the flange, and prevent the clutch from slipping, and the wheel will be carried forward as far as the end of the clutch is pushed by the collar $e$, and the springs $f$ $f$ hold the clutches back in position, while the opposite collar and clutches carry the wheel forward. The two pitmen D D' are attached by a pivot, $i$, to the sandal C with one common pivot or center; but still both are actuated from one end of a single sandal, which sandal may be used by one foot or by both feet, but is distinct from two sandals moved by both feet, imparting the same and not an alternate motion. To the pitmen there is an outside covering, H, applied on each side, and screwed or otherwise fastened to the collars $e$ $e'$; and in small machines, or when the power desired is small, the wrist-pins may be attached to H and answer the purpose of the arm; but when much power is to be applied the arm is indispensable, and the wrist-pin may be put through H into the arm $b$. In Fig. 1 the ends $m$ and $n$ of the pitmen are shown attached to H, but the location of an inside arm, $b$, is shown by the dotted lines. If the cover H is made sufficiently heavy, however, an arm might be dispensed with in all cases. In order to insure the continuous revolution of the shaft in one direction, the wheel E is keyed or fastened to the shaft F. The ends of the pitmen $m$ and $n$ are fastened by the wrist-pins $c$ $c'$ to the outer ends of the arms $b$ $b'$; the treadle or sandal, being fastened to the ends $i$ and $l$ of the pitmen, is moved so as to throw the forward end up. This pushes the pitmen up and raises the arms $b$ $b'$. As they rise they draw together at the top, and consequently the ends of the pitmen must approach each other, and diverge again as they descend, until the arms pass below the center, when they will again approach each other, thus necessitating a free movement at $i$ and $l$. When the pitmen are forced up, the arm $b$ is so arranged that its clutches will seize the rim or flange $h$ and carry the wheel forward, while the arm $b'$ is so arranged that its clutches slip on the rim $h'$ and allow the free movement of E in a forward direction while the arm $b'$ itself is moving backward, when the downward movement of the sandal commences, and the pitmen come down, bringing $b'$ forward, its clutches having seized the rim $h'$, and thus continuing the forward movement of E, while the clutches of the arm $b$, having released the rim $h$, the arm $b$ passes downward and backward, and only seizes the rim $h$ when the upward movement of the pitmen commences, so that, at whatever point the sandal may rest when the foot is placed upon it, the movement of the foot in either direction insures the forward movement of the shaft.

As there is no sewing-machine now manufactured which does not break thread and needles by the least backward movement, and as no operator has ever yet attained to such proficiency as to be able to start a sewing-machine always in the right direction by the use of the feet alone, it is evident how important it is, especially to beginners, to use a treadle by which the motions of the machine may be controlled by the feet alone.

I do not claim the use of an arm and clutches on one side of a flanged wheel as new; nor do I claim the use of two pitmen in any way in which they have heretofore been used; but What I do claim, and wish to secure by Letters Patent, is—

1. The wheel E, with two flanges, $h\ h'$, when used in connection with two alternately-moving arms, $b\ b'$, having the slotted collars $e\ e'$ and the clutches $a\ a\ a'\ a'$, and springs $f\ f$, so arranged and so operating as to produce a continuous revolution of the wheel E by the alternating motion of the arms $b\ b'$.

2. The two pitmen D D', hinged at one end of a single sandal, and operating to move the arms $b\ b'$ on opposite sides of the shaft F.

3. The combination of the sandal C, pitmen D D', arms $b\ b'$, slotted collars $e\ e'$, clutches $a\ a'\ a\ a'$, springs $f\ f$, and driving-wheel E attached to the shaft F, as shown and described, and substantially as and for the purpose hereinbefore set forth.

FREDERICK HOBBS COOMBS.

Witnesses:
HENRY H. BUTLER,
FRANK W. LEAVITT.